July 26, 1949.　　　　　　　L. E. WEAVER　　　　　　　2,477,023
APPARATUS FOR TESTING CABLES
Filed May 23, 1944　　　　　　　　　　　　　4 Sheets-Sheet 1

Inventor
Leslie Ernest Weaver.
By
Edward D. Phinney
Attorney

July 26, 1949.  L. E. WEAVER  2,477,023
APPARATUS FOR TESTING CABLES
Filed May 23, 1944  4 Sheets-Sheet 2

Inventor
Leslie Ernest Weaver.
By
Edward D. Phinney
Attorney

July 26, 1949.    L. E. WEAVER    2,477,023
APPARATUS FOR TESTING CABLES
Filed May 23, 1944    4 Sheets-Sheet 3

(a)    (b)    (c)

Inventor
Leslie Ernest Weaver
By
Edward D. Phinney
Attorney

July 26, 1949.  L. E. WEAVER  2,477,023
APPARATUS FOR TESTING CABLES
Filed May 23, 1944  4 Sheets-Sheet 4

Inventor
Leslie Ernest Weaver.
By
Edward D. Kinney
Attorney

Patented July 26, 1949

2,477,023

UNITED STATES PATENT OFFICE 2,477,023

APPARATUS FOR TESTING CABLES

Leslie Ernest Weaver, London, England, assignor, by mesne assignments, to International Standard Electric Corporation, New York, N. Y., a corporation of Delaware Application May 23, 1944, Serial No. 536,956
In Great Britain June 4, 1943

2 Claims. (Cl. 175—183)

1

The present invention relates to means for testing electrical transmission lines, and is more particularly concerned with arrangements for locating and measuring the magnitudes of irregularities in lines.

It is well known that if a change in one or more of the parameters of a transmission line occurs at any point, a change in impedance is produced so that waves transmitted down the line are partially reflected back to the sending end. This circumstance provides a convenient means of locating faults in transmission lines since these faults are practically always the cause of changes in the line parameters.

Test methods for locating faults in power distribution circuits, either underground cables, submarine cables or overhead lines, have received considerable attention in the past. The problem is complex and many differing methods have been evolved in an attempt to make the localisation of a fault of any kind a speedy and accurate process. These methods have in general been concerned with the measurement of resistance and/or capacitance with the object of determining the resistance in ohms or the capacitance in microfarads between the test point and the fault. Then if the value of either per unit length of the cable in question is known, the distance from the test point to the fault may be evaluated. For example, a fault consisting of a direct connection between a cable conductor and earth or metallic sheath may be located by a simple resistance test, and a fault consisting of a clean break in the cable conductor may be located by a capacitance test.

The faults which actually occur in power distribution circuits, particularly in high voltage feeders, i. e. 33 kv. and over, are usually more complex than the two examples cited. There may be a partial breakdown to earth with a capacitance in parallel, or a high resistance break in the conductor and a considerable change in, for example, the capacitance of the cable for some distance on either side of the fault. Tests for resistance and capacitance from a point remote from such a fault may give anomalous results which may be further complicated if two or more faults exist in the cable, with consequent uncertainty and delay in localisation.

The problem is substantially the same in the case of intelligence communication lines, which may also be cables or overhead wires, and the same kind of apparatus may therefore be used for locating faults on communication or power distribution lines, whether in cable or open wires.

2

In U. S. patent to Gould, 2,345,932, there is described apparatus for locating impedance irregularities in which short electrical pulses are transmitted down the line, and the pulses reflected from irregularities are observed and measured. From the information derived from the reflected pulses, it is possible to estimate both the distance and the magnitude of the irregularities. The object of the present invention is to provide improvements in the arrangements described in the above quoted specification by which the accuracy and convenience of the measurements are increased. The invention is applicable to transmission lines used either for the distribution of electric power, or for electrical communication of intelligence, and such lines can be either cables or overhead wires.

It has already been stated that the problem is similar in all such cases and the transmission effects at the high frequencies which are employed for the pulses are similar, so that the same apparatus may be used for all types of line without any alteration, provided it has the necessary range.

In the case of power distribution lines (particularly when they are cables) the apparatus is mainly useful for locating definite faults; but in communication cables, besides its value for finding faults, it is useful for estimating the quality of a newly installed cable since it is able to detect the small irregularities due to manufacturing variations in the successive cable lengths. For this reason, also, it is very useful for routine testing and appraising of cable lengths during production in the factory.

According to the invention, therefore, there is provided apparatus for investigating impedance irregularities in an electrical transmission line comprising means for applying pulses to the line, means for applying pulses reflected from the irregularities to indicating means, and means for adjusting the form of pulses to correct for the distortion caused by different distances of the reflecting irregularities from the end of the line to which the pulses are applied.

According to another aspect, there is provided apparatus for investigating impedance irregularities in an electrical transmission line comprising means for applying to the terminals at one end of the line a train of regularly repeated electrical pulses of short duration, and equalising means connecting the said line terminals to an indicating device in such a manner that pulses reflected from an irregularity are transmitted through the equalising means and are registered by the device, the said equalising means being adapted to correct the distortion of the said reflected pulses caused by transit through the line.

Alternatively, the invention may provide apparatus for locating and measuring impedance irregularities in an electrical transmission line comprising means for transmitting a train of regularly repeated short duration electrical pulses down the line, and means for transmitting the pulses reflected from the irregularities through an equalising means to an indicating device, the transmission characteristic of the equalising means being varied in time synchronously with the regularly repeated pulses in such manner that when a particular reflected pulse arrives, the characteristic of the equalising means is such as to equalise partly or wholly the transmission frequency characteristic of a length of the line equal to double the distance from the transmitting end to the irregularity corresponding to the particular reflected pulse.

According to another aspect, the invention consists in apparatus for measuring impedance irregularities in an electrical transmission line comprising means for applying a train of regularly repeated short duration electrical pulses to the line and means for transmitting pulses reflected from the irregularities to an indicating device, the last mentioned means comprising means for correcting the amplitudes of the reflected pulses as registered by the device in accordance with the distortion due to the transit of the pulses in the line to and from the corresponding irregularities.

The invention will be fully described with reference to the accompanying drawings in which.

In order to make the explanation of the invention clear, particular numerical examples will be given. It will, of course, be understood that these values are not intended as limitations to the invention, and may be changed according to circumstances.

Figure 1:
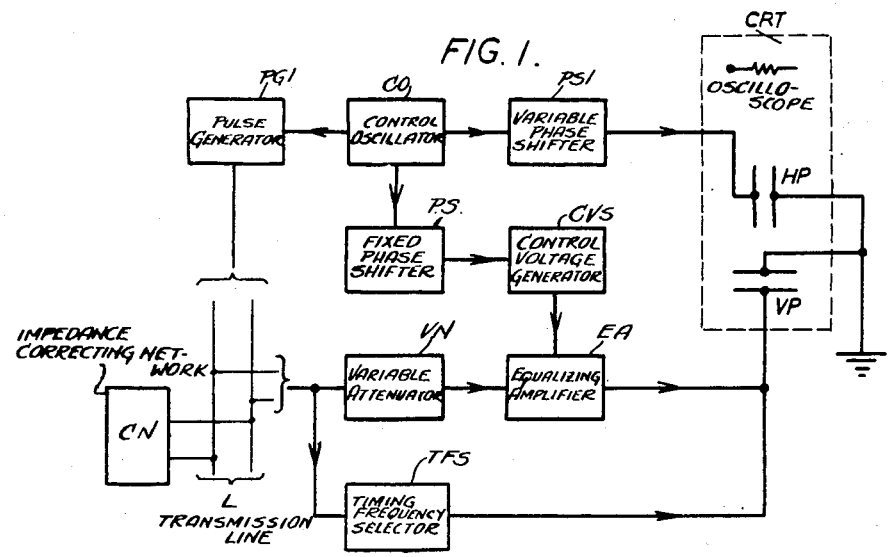
Fig. 1 shows a block schematic diagram of one arrangement according to the invention.

Fig. 1 shows a block schematic diagram of one embodiment of the invention. A control oscillator CO delivers sinusoidal waves to a pulse generator PG1 at a frequency of 20 kilocycles per second. The pulse generator is designed according to well known methods to produce one unidirectional pulse per cycle of the sinusoidal waves having a duration of about 0.25 microsecond. The train of pulses generated by PG1 is applied to the input terminals of the transmission line under test at L, these terminals being also connected to a variable attenuator VN leading to an equalising amplifier EA which is connected to the vertically deflecting plates VP of a cathode ray oscillograph tube CRT of well known type, operating details of which are not shown.

The oscillator CO also supplies the sinusoidal waves through a variable phase shifter PS1 to the horizontally deflecting plates HP of the oscillograph tube to provide the necessary time base. A timing frequency selector TFS is connected to the input of the variable attenuator VN, and the output is connected to the vertically deflecting plates VP. This is for the purpose of marking an accurate time scale on the screen of the oscillograph, and will be explained more fully later on.

The equalising amplifier is controlled by the waves generated by the oscillator CO through a fixed phase shifter PS and a control voltage generator CVG. This amplifier is provided for compensating for the line distortion suffered by the pulses which have been reflected from the irregularities of the line so that their form and amplitude as recorded on the oscillograph screen can be used to determine the magnitude and nature of the irregularities. This will also be fully explained later on.

In U. S. Patent 2,345,932 mentioned above, which describes the basic or prototype arrangement employed in the present invention, it was originally stated that a complementary attenuation network is shunted across the line under test to minimise the difficulty arising from the frequency variation of the line attenuation, and it was said that the arrangement provides substantially constant attenuation over a desired range of frequencies.

A closer consideration will show that a network in this position could not perform this function. The real purpose of this network is as an impedance correcting network, and it may be employed if necessary in the present invention for this purpose, and is shown in Fig. 1 accompanying this specification as the impedance correcting network CN shunted across the line L. Its real action will be understood from the following considerations.

In order to avoid multiple reflections of the pulses, which would interfere with the interpretation of the record on the oscillograph, it is necessary that the impedance terminating the line at the sending end should match the characteristic impedance of the line over a wide frequency range. In a co-axial cable, for example, the characteristic impedance is substantially a constant resistance for high frequencies, but at low frequencies it tends to increase and to acquire a negative angle. It is usual, also to design the apparatus which is connected to the line so that it presents an impedance which is substantially a constant resistance. The network CN (when necessary) will, therefore, be designed to correct the impedance terminating the line so that a close match is obtained over the necessary frequency range. Any distortion introduced by CN may be dealt with by treating it as part of the line distortion.

The circuit of Fig. 1 becomes substantially the same as the prototype arrangement shown in Fig. 1 of the U. S. Patent 2,345,932 referred to above, if the elements PS, CVG and TFS are omitted, and if the equalising amplifier EA is replaced by an amplifier with adjustable gain independent of frequency and not related to the distances of the impedance irregularities. The prototype arrangement has no means for correcting the reflected pulses for line distortion, and it is the principal object of the present invention to supply such correcting means.

The circuit of the present invention operates in the following manner. The original pulses generated by PG1 travel down the line, and when an impedance irregularity is encountered, pulses are reflected back to the sending end of the line and are applied through the variable attenuator VN and equalising amplifier EA to the plates VP of the tube CRT and produce a corresponding trace on the screen. The original pulses are also traced on the oscillograph and since the sinusoidal time base is synchronised with the pulses, a permanent trace will be seen comprising a peak of high amplitude corresponding to the original pulses, and several other much smaller peaks, some of which may be inverted, corresponding to the pulses reflected from the various line irregularities.

Figure 2:
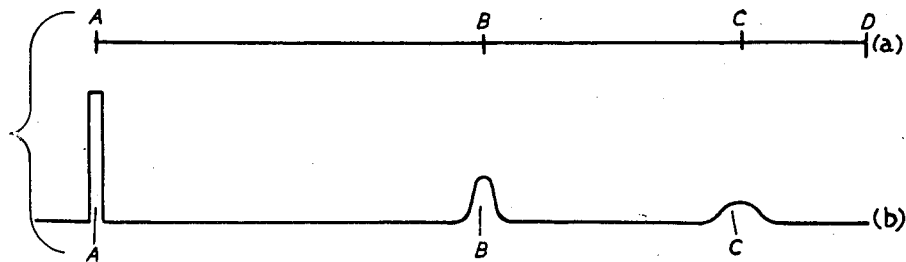
Figs. 2, 4, 5, 7, 9 and 11 show explanatory diagrams.

On account of the attenuation of the line, which varies with frequency, the reflected pulses are all more or less distorted (in the absence of any correcting means) the amount of distortion being greater as the corresponding irregularity is further from the testing end. The heights of the pulses traced on the oscillograph are variously reduced and their forms are changed so that totally misleading impressions of the type and magnitude of the irregularities may be given. Thus, referring to Fig. 2, diagram (a) shows a cable AD with two exactly similar small irregularities at points B and C. The narrow initial pulse travels down the cable until the point B is reached, by which time its height has been reduced and it has become widened out at the base because the high frequency waves which constitute the pulses are more attenuated than the low frequency waves. At B a fraction of the energy of the pulse is reflected back to A, and the form is still further distorted. If it be assumed that the pulse which is transmitted beyond B is not appreciably affected by the reflected pulse, this will continue to travel to C, suffering further attenuation and distortion. The same fraction of the energy of the pulse will be reflected back at C, and will arrive at A more distorted and attenuated than the pulse reflected from B. As a result, in the absence of correcting means, the original pulse and the two reflected pulses will appear on the oscillograph screen somewhat as shown in diagram (b) of Fig. 2, and the impression gained is likely to be that the irregularity at B is more important than that at C.

In this explanation, the phase distortion introduced by the line is ignored. This is in practice negligible compared with the effects of amplitude distortion, and the invention is therefore concerned with dealing with the amplitude distortion only. Thus according to the present invention, the equalising amplifier EA is introduced for the purpose of correcting partly or wholly for the distortion introduced by the line so that the distance of the irregularity is taken into account. In the most complete form of the invention, the gain-frequency characteristic of the equalising amplifier is made to vary periodically with time under the control of the oscillator CO, so that the characteristic at the moment of arrival of any reflected pulse is such as to equalise a length of line equal to twice the distance to the corresponding irregularity, over a frequency range sufficent to define the pulses. The characteristic of the amplifier is varied by means of a voltage produced from the sinusoidal wave by the control voltage generator CVG, which voltage varies according to the time which elapses after each initial pulse is generated. It will thus be evident that the wave form of the control voltage must have characteristics similar to those of a saw-tooth wave, since the voltage must return quickly to the starting value immediately before the emisson of any pulse.

The phase shifter PS is provided in order that the starting points of the control voltage variations may be made to coincide with the emission of the pulses, and it will not need any further adjustment after the original setting. It is to be noted that this phase-shifter could, if desired, have been placed between CO and PGI, instead of in the position shown.

Actually, it will not always be necessary for the amplifier EA completely to equalise the line for all reflected pulses in the manner described: it is found, for example, that in many cases only the gain of the amplifier need be varied with time so as to equalise the heights of the pulses. This will be more fully explained below when details are given of the design of the equalising amplifier.

In the prototype arrangement, the distances of the irregularities are measured by adjusting the phase-shifter PSI which is calibrated in phase angle for this purpose. Referring to the diagram (b) of Fig. 2, it will be understood that the effect of adjusting the phase shifter PSI will be to move the traces of the three pulses A, B and C together horizontally along the time scale. The measurement of distance is carried out by first making a mark on the oscillograph screen at the centre line of the original pulse A, and then adjusting the phase-shifter by an angle $\theta$ until the centre line of B (or C) corresponds with the mark. Then it is evident that the reflected pulse B (or C) is $\theta T/2\pi$ seconds later than the initial pulse A, where T seconds is the period of the sinusoidal wave, so that the distance to the irregularity must be $$\frac{\theta T}{4\pi} \cdot u$$

in which $u$ is the velocity of propagation in the line.

It is found in practice, however, that a continuously variable phase-shifter requires frequent calibration if accurate results are to be obtained. The arrangement of the invention therefore includes means for marking an accurate time scale on the oscillograph screen, and measurements may be made either with reference to this time scale, or by means of the phase-shifter PSI which may itself be calibrated with respect to the time scale as often as desired.

In the arrangement of Fig. 1, the timing frequency selector TFS is provided for the purpose of marking the accurate time scale on the oscillograph screen. The pulses generated by PGI having a repetition frequency of 20 kilocycles per second are applied to TFS which selects the 50th harmonic of the pulse train and applies it to the vertically deflecting plates VP of the oscillograph. Thus a sine wave at 1 megacycle per second is superposed on the trace of the pulses on the oscillograph screen, so that intervals of 0.5 microsecond are accurately marked. It has been found that the position of a pulse can be estimated by eye under suitable conditions to an accuracy of nearly 0.05 microsecond. Thus the time interval between the original pulse and a reflected pulse is measurable to an accuracy of 0.1 microsecond or possibly better. On the type of cable just mentioned the irregularity can be located to within a few yards, so that if, for example, there is a fault at a joint, the particular joint can be definitely located.

The timing frequency may be obtained from the pulse train in a number of different ways, for example, by a frequency multiplying system of known type. However, the frequency of repetition of the pulses being 20 kilocycles per second, a multiplication of 50:1 would be required to produce the desired timing frequency at 1 megacycle per second. It will be found that the arrangements necessary are complicated and unstable, and special care has to be taken that synchronisation occurs on the right multiple of the repetition frequency. For these reasons it is preferable to use a simpler method.

In the present example the pulse duration is only 0.25 microsecond which is only ½% of the repetition period. It is well known that a train of regularly repeated pulses can be analysed into a fundamental sine wave having the frequency of repetition of the pulses and a series of harmonics of this fundamental wave. When the pulses are very narrow, as in the present case, the amplitudes of the harmonics diminish very slowly with their order, and it may be shown that the 50th harmonic of the 20 kilocycle pulse train is only about 10% less in amplitude than the fundamental. This harmonic may therefore be selected and amplified to serve as the timing wave. All the harmonics also are phased so that each has a maximum amplitude coinciding with the centre of each of the pulses. It follows therefore, that the time scale marked by the 50th harmonic would have a zero coinciding with the original pulses so long as there is the same delay introduced in the paths to the deflecting plates VP through VN and TFS. Clearly, if necessary, suitable phase shifting means could be introduced in the timing frequency selector to compensate for any delay differences, so that the scale zero would exactly correspond with the original pulses.

The timing frequency selector TFS therefore preferably comprises a narrow band pass filter adapted to select the 50th harmonic of the pulse train to the exclusion of all others, followed by a suitable amplifier tuned to this harmonic and adapted to produce a timing wave having the appropriate amplitude. The band pass filter will also preferably be of the type employing quartz crystals or the like in order to obtain the desired selectivity and sharpness of cut off. This filter should, however, have an appreciable, though narrow band width so that slight variations in the repetition frequency of the pulses will not result in large amplitude changes or extinction of the timing wave. For this reason, a sharply tuned circuit for selecting the wave would not be suitable. For convenience also, the control oscillator CO should be provided with a fine adjustment of the frequency enabling the pulse repetition frequency to be accurately set so that the 50th harmonic comes in the centre of the pass band of the filter. The proper setting will easily be obtained by observing the timing frequency wave on the oscillograph.

In order to prevent the band pass filter from appreciably distorting the pulses supplied to the variable attenuator VN, it should preferably be preceded by a suitable series resistance or by a buffer valve stage so that the input impedance of the timing frequency selector TFS will appear substantially like a constant resistance.

Figure 3:
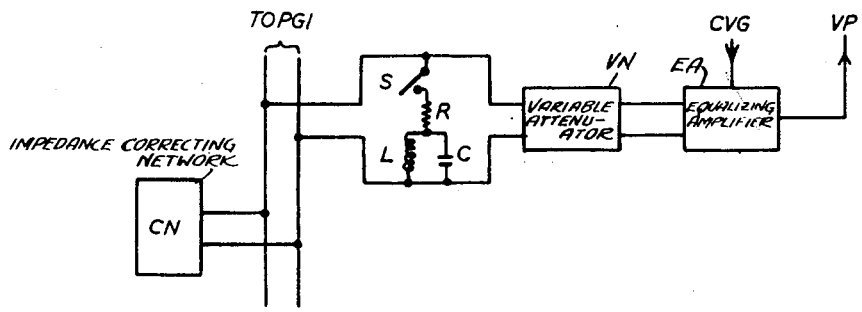
Fig. 3 shows a schematic circuit diagram of a device for generating a timing frequency.
Figure 4:
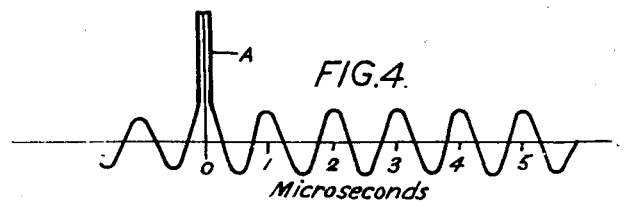

The timing wave may be provided in another way which, though less convenient, is considerably simpler, and may therefore be preferable in portable equipment, for example. The arrangement is shown in Fig. 3 which shows a modification of the lower part of Fig. 1, the timing frequency selector TFS being not required. The input of the variable attenuator VN is provided with a shunt circuit comprising a resistance R connected in series with a parallel resonant circuit L, C having a very low damping, tuned to the frequency desired for the timing wave. This shunt circuit may be connected by closing the switch S. The pulses generated by PG1 then produce free oscillations in the tuned circuit L, C by shock excitation and if the damping is small, the amplitude of the oscillations will diminish slowly. There will thus appear on the oscillograph screen the pulses with the oscillations superposed thereon; constituting the timing wave. However, the amplitude of the oscillations will be very small with the usual setting of the attenuator, and to make them satisfactorily visible it will be necessary to reduce the attenuation considerably. For this reason the line under test and the correcting network CN should be temporarily disconnected. Fig. 4 shows the timing wave as registered on the oscillograph. The original pulse at A marks the zero of the scale, and the 1 megacycle waves then follow. A scale at intervals of 0.5 microsecond may then be marked on the oscillograph screen, and will be available for use in measuring the reflected pulses. After the scale has been marked in this way, the switch S is opened, disconnecting the resonant shunt, and the line and correcting network may be re-connected.

It will be understood that the amplitude of the pulse A in Fig. 4 will be very great in comparison with that of the superposed waves, and will actually be limited by the amplifier EA. Furthermore, if the damping of the resonant circuit L, C is small, the decrease in amplitude of the waves traced on the oscillograph screen will scarcely be visible.

In Fig. 3 L and C may be a suitable inductance and capacity, respectively, tuned to the frequency desired for the timing wave, or they may represent any other equivalent resonant device having low damping such as a quartz crystal, or a narrow band filter.

By the arrangement of Fig. 3, it is not necessary to synchronise the timing wave accurately with the pulses, but the resonant frequency should be adjusted with sufficient precision to enable the time scale to be within the necessary accuracy.

Referring to Fig. 1, it has been mentioned that the equalising amplifier EA is intended to equalise the line distortion for any reflected pulse irrespective of the distance of the corresponding irregularity. This requires that the gain-frequency characteristic of the amplifier should vary according to the time which has elapsed after the emission of each pulse from the pulse generator. While this is theoretically quite possible to achieve, there are a number of practical difficulties which must be overcome before complete correction can be obtained. The chief difficulty lies in developing an equaliser for a very wide band of frequencies which can be varied by means of the voltage obtained from the control voltage generator CVG which itself varies in a saw-tooth manner as already explained. Consequently one way of dealing with the problem is effectively to reduce the width of the equalising band by providing modulating means to transfer the signal which comprises the various pulses to a much higher frequency range, and after equalising to transfer it back again. This transferring is, of course, a well known process.

It is found, however, that complete correction in the manner just described is not always essential, and simpler arrangements involving partial correction give satisfactory results in practice. It is frequently sufficient to provide means whereby the heights of the reflected pulses may be corrected without otherwise correcting their form, because this enables the importance of the various irregularities to be immediately assessed.

Figure 5:
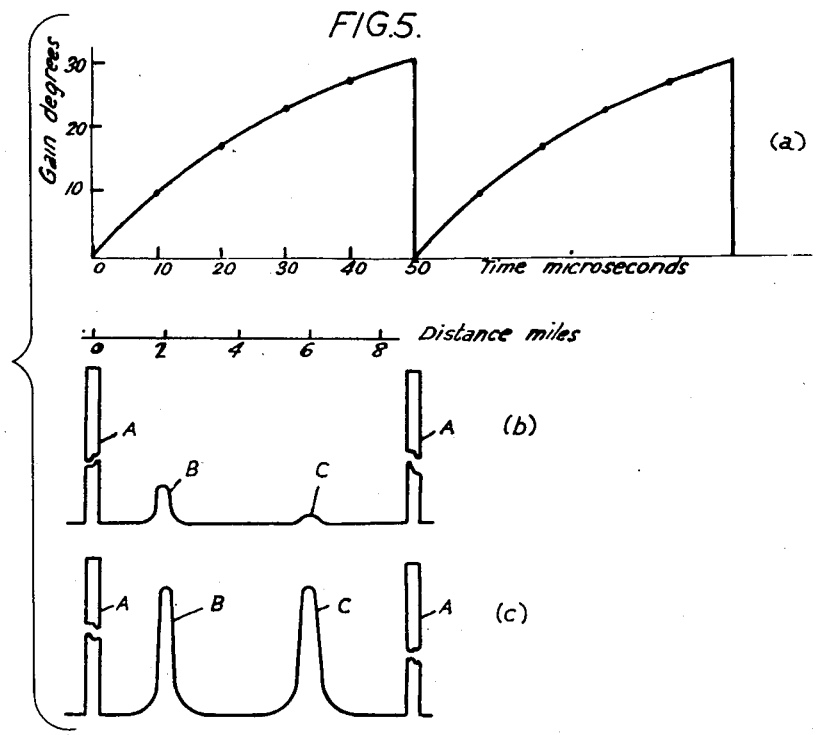

In Fig. 5, diagram (a) shows two periods of the time variation of the relative gain required for the equalising amplifier EA, in order to correct the heights of pulses reflected from irregularities at various distances in a type of coaxial cable commonly used for broad band carrier frequency communication. The horizontal scale represents time in microseconds, and the vertical scale is the relative gain in decibels. The corresponding scale of distances in miles is marked below the time scale, the figures representing twice the distance to the irregularity measured along the cable, the velocity of propagation in this cable being about $1.8 \times 10^5$ miles per second. It will be understood from what was stated earlier that the attenuation which has to be corrected is that of twice the length of cable to the irregularity.

Fig. 5 diagram (b) shows for illustration two of the original pulses A and two pulses B and C reflected from equal irregularities distant 1 mile and 3 miles from the testing end of the cable, as they would be received without any correction. Since in general only a small fraction of the energy is reflected, the pulses A will have heights which are very large compared with the heights of B and C and they have been shown broken to indicate this.

The height of B will be about three times that of C owing to the attenuation of the cable, and as indicated by the diagram (a), the pulse C will require about 10 decibels more amplification than B. When correction is introduced by the amplifier the pulses will appear as diagram (c) in Fig. 5, B and C being now both amplified so as to be of the same height. The pulses A will of course not be affected since the relative gain at zero time is zero.

The curves of diagram (a), Fig. 5, show the form required by the gain-time characteristic of the amplifier EA of Fig. 1 for a particular kind of cable. They are of roughly experimental form. It is well known to vary the gain of an amplifier by means of a control voltage applied to a control grid of a thermionic valve in the amplifier (or to the grids of several valves) by which means the amplification factor $\mu$ of the valve or valves is varied. In known systems this arrangement is usually employed for volume control purposes and the like, and the control voltage is derived in some way from the signals being transmitted, so that the gain of the amplifier is made to depend on the signal level. In the present case the control voltage which is supplied from the control voltage generator CVG in Fig. 1 depends on the time and not on the signal level. This control voltage must vary in such a manner as to produce a gain variation of the type shown in diagram (a), Fig. 5.

Figure 6:
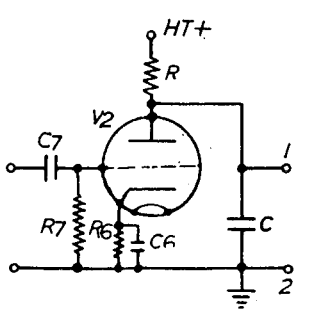
Figs. 6 and 8 show circuit diagrams of control voltage generators according to the invention.

Fig. 6 shows the circuit of a well known type of saw-tooth wave generator which may be adapted to serve as a simple control voltage generator. It comprises a gas-filled triode valve $V_2$ shunting a condenser C charged through a resistance R from the high tension source connected at HT+. The control grid is connected to ground through an appropriate grid resistance $R_7$, and is biassed negatively by means of the resistance $R_6$ connected in series with the cathode and shunted by the condenser $C_6$ (or in any other convenient way). Synchronising waves are applied to the control grid through the blocking condenser $C_7$ from the oscillator CO (Fig. 1) through the phase shifter PS. Saw-tooth waves may be obtained from the terminals 1 and 2.

The condenser C charges up through the resistance R until the striking potential of the valve is reached, and it then becomes conducting and short-circuits the condenser, after which the charging cycle recommences. The voltage across the condenser C varies in an exponential manner with time, and is therefore of the right type to produce gain curves of the kind shown in Fig. 5 (a). It is required to choose the conditions so that the curve will be of approximately the right shape.

Figure 7:
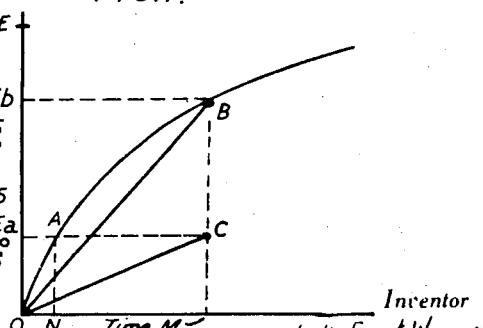

Fig. 7 shows the charging curve for the condenser C, the abscissae being times and the ordinates the corresponding condenser voltages. In this figure E represents the voltage of the high tension source and is the maximum value which the condenser voltage can reach.

By suitably biassing the control grid of the valve, it may be arranged so that the striking voltage has any desired value (within certain reasonable limits). Thus if the control grid be given a small negative bias, the valve will strike at the point A corresponding to a rather low voltage $Ea$ in Fig. 7. The portion OA of the curve gives the shape of the sloping parts of the waves and AN represents the fly-back stroke. In this case OA is practically a straight line. If, however, the negative grid bias be increased, the valve will discharge at a higher voltage $Eb$ corresponding to the point B, the fly-back stroke being BM and the portion OB of the curve is now very decidedly curved. It will thus be seen that adjustment of the control grid bias provides a means of adjusting the degree of curvature of the sloping portions of the saw-tooth waves. This adjustment in itself is however not sufficient since it also changes the period of the waves. Thus since AN and BM are the fly-back strokes corresponding to the points A and B respectively, the corresponding periods will be ON and OM. This can be overcome, however, by appropriately changing R and/or C when an adjustment of the bias is made. It will be understood that the amount of curvature of the portion OB of the curve utilised is determined by the ratio $E/Eb$, while the time OM taken to reach the point B depends on the time constant R. C. of the condenser circuit. Hence suppose that the curvature required is that corresponding to the point A, but the period required is OM. The control grid bias is adjusted to produce a striking voltage $Ea$ and the time constant R. C. is then changed so that the charging curve is the nearly straight line OC (the line AC being parallel to the time axis). If the circuit of Fig. 6 be followed by a suitable amplifier, the amplitude CM of the saw-tooth waves may be adjusted to any desired value; for example, it could be raised to BM, in which case the sloping portions of the waves would be represented by the nearly straight line OB. By comparing the line OB and the curve OAB the effect of changing the striking voltage from $Ea$ to $Eb$ may be judged. If the point B were taken much further up the curve, so that $Eb$ is nearly equal to E, much greater curvatures can be obtained.

Further modification of the curve may be obtained by using a more complex charging circuit, such as that obtained connecting the terminals 1—3 and 2—4 in Fig. 6 (thus adding the network $C_5$, $R_5$), taking the output from terminals 5 and 6. The effects of such modifications can be determined from known principles.

When designing the circuit of Fig. 6 to produce a gain curve suitable for a particular type of line, it would no doubt be possible to calculate the values of the components from the data available, but in practice it will be found simpler to determine them experimentally.

The saw-tooth oscillator shown in Fig. 6 is only one example of a type which can be used. Various other well known circuits can be adapted to produce waves of the required shape, according to similar principles.

It is, of course, necessary that the fly-back stroke of the saw-tooth waves should coincide with the emission of the pulses by the generator PG1. To ensure this, the phase shifter PS (Fig. 1) is introduced before the control voltage generator CVG (or alternatively, before the pulse generator PG1), and will be set accordingly, it will not require any subsequent adjustment.

In cases where several valves of the amplifier EA are controlled in the manner described, it may be found convenient to apply the control voltage through buffer valves in order to avoid the coupling difficulties which might otherwise arise from applying the control voltage from the same source to the several stages.

Figure 8:
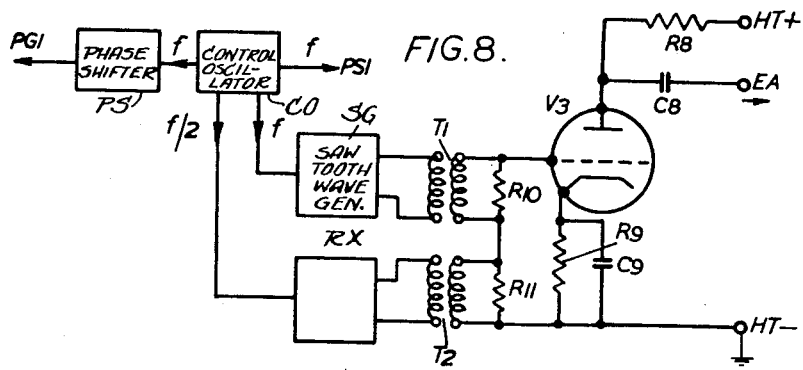

Fig. 8 shows another type of control voltage generator which, though less simple than Fig. 6, allows rather more control over the wave-form of the control voltage. It requires that the control oscillator CO (Fig. 1) shall provide two frequencies, namely $f$, the frequency of repetition of the pulses, and also $f/2$, which should be synchronised. This can be done in several well known ways: for example, the oscillator may generate the frequency $f/2$ and the frequency $f$ may be obtained therefrom by means of a frequency doubler, and will be supplied to PG1 and PS (Fig. 1) as well as to the control voltage generator as indicated in Fig. 8.

The control voltage generator of Fig. 8 comprises a saw-tooth wave generator SG of any suitable type synchronised by the frequency $f$, and a full wave rectifier RX (such as a double diode, or pair of diodes, or a bridge of dry rectifiers) supplied with the frequency $f/2$. The outputs of SG and RX are simultaneously applied through transformers $T_1$ and $T_2$ to the control grid of a mixing valve $V_3$, in which the anode potential is supplied through a resistance $R_8$ from the terminal HT+, and the cathode is suitably biassed by means of the resistance $R_9$ shunted by the condenser $C_9$. The output is taken from the anode through a blocking condenser $C_8$. Resistances $R_{10}$ and $R_{11}$ are appropriate terminating loads for the transformers $T_1$ and $T_2$.

Figure 9:
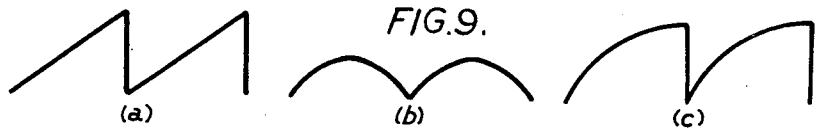

Thus saw-tooth waves as shown at (a), Fig. 9, will be obtained from the output of SG, and half-sine waves as shown at (b) will be obtained at the output of RX. Since RX is supplied with a frequency $f/2$, there will be a half-sine wave (b) for each saw-tooth wave (a). If the synchronising be arranged so that the zeros of the half-sine waves coincide with the fly back strokes of the saw-tooth waves, then the mixed output from the valve $V_3$ will be waves like (c), Fig. 9, obtained by adding the ordinates of the waves (a) and (b). These waves will be seen to be of the same general character as the waves shown at (a) in Fig. 5. The amount of curvature can be controlled by suitably adjusting the relative amplitudes of the waves (a) and (b), Fig. 13, and further control may be obtained by the use of an appropriate shaping network (not shown) interposed between the oscillator CO and the full wave rectifier, by which the half-sine waves may be suitably distorted. Considerable variation of the shape and curvature of the waves (c) is possible by these means.

It will be understood that the outputs of SG and RX may be mixed in various other well known ways, the arrangement shown in Fig. 8 being just one example.

In Fig. 8 the phase shifter PS is shown between the control oscillator CO and the pulse generator PG1, since in this case it will be preferable to place it in this position.

Figure 10:
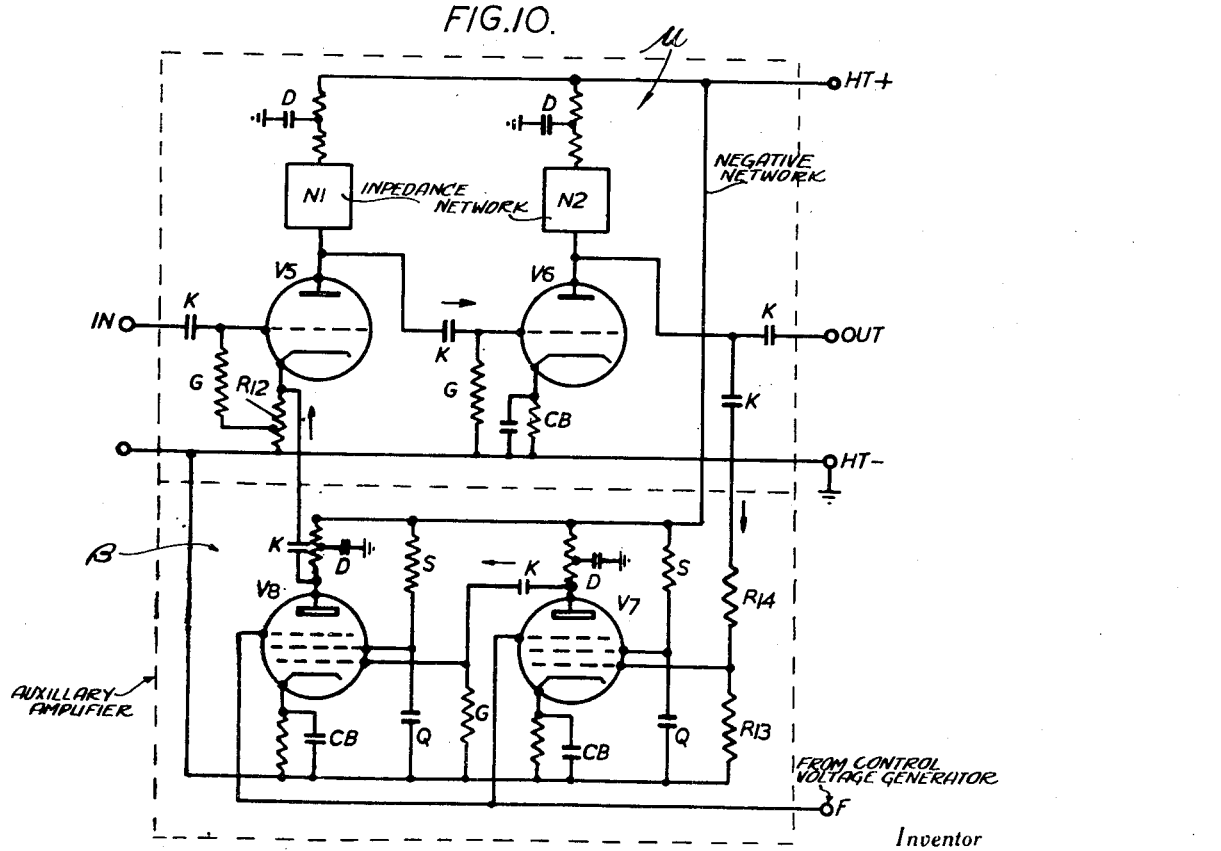
Figs. 10 and 12 show circuit diagrams of amplifiers according to the invention.

A preferred form of the amplifier EA is shown in Fig. 10. It comprises a forward amplifier $\mu$ provided with a negative feedback path $\beta$ which includes an auxiliary amplifier the gain of which is controlled by the voltage derived from the control voltage generator CVG in the manner explained, which voltage is applied at F. The effective gain of the amplifier measured between the points In and Out then depends upon the gain of the auxiliary amplifier and varies in the opposite sense. The path $\beta$ should preferably have an overall gain or loss which is independent of frequency for any value of the control voltage.

The amplifier EA may have other amplifying stages (not shown) preceding and/or following the stages shown in Fig. 10. These other stages may be arranged in any well known way.

In Fig. 10 circuit details are given of the forward amplifier $\mu$ and of the feedback path $\beta$, to serve as one example of an arrangement which can be used. These circuits comprise certain conventional and well known arrangements which will be pointed out without further explanation; thus D indicates generally a decoupling arrangement for the anode of a valve; K is an appropriate blocking condenser; G is a grid resistance, and CB a self-biasing arrangement for the cathode.

The forward amplifier $\mu$ comprises two tandem-connected valves $V_5$ and $V_6$ shown as triodes for simplicity, but they can be of any appropriate type. In series with the anodes of these valves are connected impedance networks $N_1$ and $N_2$ respectively. The feedback path $\beta$ comprises a potentiometer formed from two resistances $R_{13}$ and $R_{14}$ followed by a two-stage amplifier which includes the valves $V_7$ and $V_8$. These valves should preferably be of a type having at least two control grids with a screen grid arranged between them, one of these control grids being designed for controlling the amplification of the valve. Each screen grid is polarised through a resistance S, by a by-pass condenser Q being provided in the usual way. The two amplification control grids are connected to the terminal F to which the voltage from the control voltage generator CVG is applied.

The signal control grid of $V_7$ is connected to the junction point of the resistances $R_{13}$ and $R_{14}$ and the anode is connected through a condenser K to the signal control grid of the valve $V_8$.

The potentiometer $R_{13}$ and $R_{14}$ is effectively shunted across the anode circuit of $V_6$, so that a fraction of the anode voltage is applied to the signal control grid of $V_7$. The anode of $V_8$ is connected to the cathode of $V_5$ which is connected to earth through resistance $R_{12}$, so that the output voltage is applied to the input circuit of $V_5$, thus completing the feedback loop. With the circuit arranged as shown, the feedback is negative as desired. If necessary, additional means (not shown) may be supplied according to known practice in order to prevent instability of the arrangement at frequencies outside the operating range.

If it should be desired only to control the gain of the amplifier for the purpose of correcting the amplitudes of the reflected pulses, then the networks $N_1$ and $N_2$ may be simple resistances, or may be omitted, the forward and auxiliary amplifiers being otherwise designed to have flat frequency characteristics. Then as the gain of the auxiliary amplifier is decreased by the control voltage applied at F, so the gain of the whole amplifier as increased between the terminals In and Out will increase, and vice versa. The desired variation with time may be obtained by suitably designing the control voltage generator as already explained.

It will be understood that by employing the preferred type of valve of $V_7$ and $V_8$, the two amplification control grids may be connected together as shown, since the corresponding signal control grids are efficiently screened therefrom. However, unscreened valves may be used, but then the control voltage must be applied to the amplification control grids through separate buffer valves (not shown) in order to prevent coupling between the two signal control grids.

The arrangement of Fig. 10 is particularly suitable for introducing some correction for the frequency distortion of the reflected pulses. By suitably choosing the impedance networks $N_1$ and $N_2$, the gain of the forward amplifier $\mu$ is made to vary with frequency in the manner required to compensate partly for the frequency distortion of the maximum length of line which can be dealt with (for example, about 4 miles of the cable to which Fig. 5 refers). The characteristic may be similar, for example, to curve (a) of Fig. 11. Curve (a) then represents the characteristic of the amplifier EA when the feedback is zero. As the gain of the auxiliary amplifier is increased, so the overall gain of the amplifier EA is reduced and the characteristic is flattened until with a large amount of feedback the gain is nearly constant and small, corresponding to irregularities very near the testing end. The progressive variation of the gain characteristic is shown by curves (b), (c) and (d) of Fig. 11. By suitably proportioning the circuits, the progressive variation of the curves (a) to (d) may be made to compensate approximately for the distortion of the pulses reflected from any point in the line.

Figure 11:
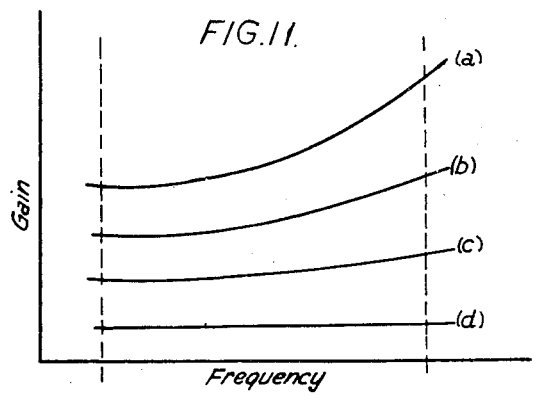

By a variation of this method, the forward amplifier $\mu$ may be given a flat characteristic, and the auxiliary amplifier may be given a characteristic which is inverse to curve (a) of Fig. 11 (that is, it is similar to the reflection of curve (a) in frequency axis), and remains of constant shape as the gain is changed. This may be done, for example, by the use of networks (not shown) similar to $N_1$ and $N_2$ connected in series with the anodes of $V_7$ and $V_8$. When the gain of the auxiliary amplifier is a minimum, the overall gain characteristic of the whole amplifier EA will be substantially like curve (a) being lowered and flattened as the gain of the auxiliary amplifier is increased, producing substantially the curves (b), (c) and (d).

Figure 12:
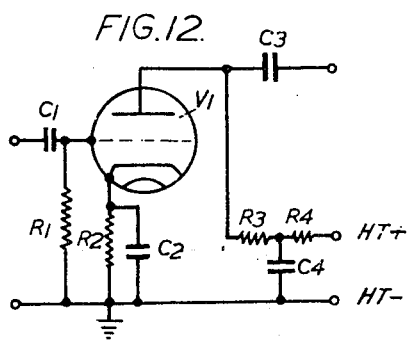

Another very simple method of obtaining the desired time variation of the gain of the amplifier EA, without frequency correction, which has been found to give satisfactory results in some cases, is shown in Fig. 12. This does not require a control voltage, so the elements PS and CVG of Fig. 1 are omitted. Fig. 12 shows one stage of the amplifier EA comprising a valve $V_1$ of any suitable type, shown as a triode for simplicity. The pulses are applied to the control grid through a network $C_1R_1$ having a time constant of the same order as the period of repetition of the pulses. The cathode is shown biassed by means of a conventional arrangement comprising a resistance $R_2$ shunted by a condenser $C_2$. The anode is supplied from the high tension source HT+ and HT— through a decoupling network comprising the resistances $R_3$ and $R_4$ and the condenser $C_4$. The output is taken from the anode through the condenser $C_3$.

The action of the circuit depends on the circumstance that the initial pulses are of considerably greater amplitude than any reflected pulses likely to be received. It should be arranged that the initial pulses are applied in the positive direction to the condenser $C_1$. When an initial pulse arrives, a high positive voltage is applied to the control grid, which causes grid current to flow so that the condenser $C_1$ is charged. With the disappearance of the pulse, the condenser is left with this charge which leaks away through the resistance $R_1$ producing a negative voltage on the grid which is initially almost equal to the pulse voltage and decreases exponentially with time. The valve $V_1$ should have a variable $\mu$ characteristic so that its gain is reduced to a low value at the beginning of each cycle and then rises continuously, following a curve like diagram (a) of Fig. 5. The form of the curve depends on the valve chosen, its electrode voltages, and the value of the time constant $C_1R_1$.

The time constant will, of course, introduce a certain amount of distortion of the reflected pulses which increases as the time constant is smaller; but in practice the effect has not been found to be important.

The valve $V_1$ can, of course, have additional grids suitably polarised in any known way, and in practice, a pentode will probably be found preferable. Any other convenient methods of biassing the control grid and supplying the anode current could, of course, be used.

Figure 13:
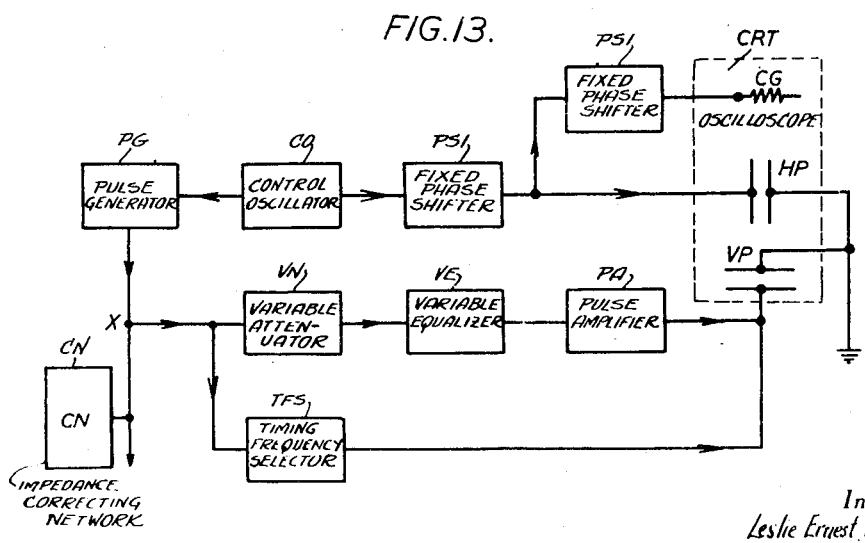
Fig. 13 shows a block schematic diagram of another arrangement according to the invention.

The automatic equalising arrangements which have so far been described are particularly useful when it is desired to get a general view of all the irregularities present in a certain length of line. When, however, there are a large number of irregularities, the picture presented is liable to be complicated and it may be preferable to be able to study each reflected pulse separately. For this purpose an automatic equalising arrangement is not convenient, and a different method which allows one pulse to be equalised at a time is preferable. This arrangement is shown in Fig. 13, which is a modification of Fig. 1. Elements which are the same in both figures are similarly designated and will not be again described.

In Fig. 13 a variable equaliser VE followed by a pulse amplifier PA replace the equalising amplifier EA of Fig. 1, the elements PS and CVG not being required. A second pulse generator PG2 adapted to supply substantially square pulses to the control grid CG of the cathode ray tube, is controlled by the sinusoidal waves from the output of the phase shifter PS1.

The variable equaliser VE is adapted to be adjusted by hand and will contain a series of equalising networks controlled by switches and designed, for example, on the decade principle to equalise any length of a given type of line. The amplifier PA should give a gain which does not vary with time, and which is also preferably independent of frequency, though any frequency variation could be separately compensated or taken into account in the design of the variable equaliser.

Neglecting for the moment the pulse generator PG2, whose purpose and action will be described later, one of the reflected pulses visible on the oscillograph will be chosen for study, and the distance of the corresponding irregularity will be measured by comparison with the time scale in the manner already explained. The variable equaliser VE is then set to equalise the corresponding length of line, and the selected pulse will then be corrected for the line distortion. The height of the pulse then gives the magnitude of the irregularity and its form gives an indication of the type of irregularity.

Owing to the large number of reflected pulses which may be present, however, it is often difficult to keep in mind which of them is the one which has been selected for study. To avoid this difficulty the pulse generator PG2 has been provided.

The control grid CG of the oscillograph tube is biassed negatively so that the beam is suppressed. The pulse generator PG2 applies positive pulses through a blocking condenser to the control grid CG which are of sufficient magnitude to release the beam and to allow it to form a trace on the screen. The duration of the pulses should be sufficient to overlap in time by a small margin, any reflected pulse which is to be observed. The releasing pulses are synchronised by the sinusoidal waves obtained from the output of PS1, and should be arranged to occur when the voltage of the wave is changing sign, that is, when the time deflection of the oscillograph is substantially linear. Thus only a comparatively narrow portion of the cycle will be visible on the screen, and if the phase shifter PS1 be adjusted, the various reflected pulses will be seen as though passing by a window, and any one of them may be picked out for study to the exclusion of the others.

It may be added that, if necessary, a phase shifter may be inserted immediately before the pulse generator PG2, to enable the pulses to be produced at the desired part of the cycle of the sine wave.

In cases where the line is subject to noise, the location of the irregularities may be interfered with and some advantage may be gained by applying the equalisation to the initial pulses instead of to the reflected pulses. This will minimise the effect of the noise, but the amplifier PA should be capable of handling very large amplitudes since, apart from the fact that the pulses generated by PG1 have a large amplitude to begin with, the equaliser VE may distort the pulses into a wave-like form having still greater amplitudes.

Having obtained reflected pulses equalised in any of the ways described, they may be photographed, if desired, to obtain a permanent record, or their amplitudes may be measured in order to obtain a measure of corresponding irregularities. The simplest method of doing this is to measure the height of the trace of a reflected pulse on the oscillograph screen and then to adjust the attenuator VA until the initial pulse is reduced to the same height. The attenuation introduced then gives the ratio of the impedance at the point of irregularity according to well known principles. Some of the pulses may be inverted, and these are measured in the same way. Various other methods of comparing the pulses can clearly be used.

It will be understood, of course, that any additional amplifiers (not shown) which may be necessary may be introduced; for example, amplifiers may be desirable immediately before each pair of deflecting plates of the oscillograph, if it is not convenient to provide the necessary gain in the amplifiers EA or PA of Figs. 1 and 13. These amplifiers will enable the scale of the deflection to be expanded or contracted as desired.

It will, of course, be understood that the sinusoidal time base will only produce a substantially linear deflection over part of the range indicated in Fig. 5, so that the frequency scale marked by the timing frequency selector TFS will not be evenly divided throughout. However, since the same distortion is applied to the pulses, the time measured on this time scale will still be accurate. The phase shifter PS1 enables the linear part of the time scale to be shifted to any region where it is desired to make a comparison with the time scale. These considerations apply equally to Figs. 1 and 13; but in Fig. 13, the region in view will always be the region where the time base is linear.

It is again emphasised that the particular numerical values such as the frequency of repetition of the pulses, which have been quoted as an example are not in any sense essential values, and should be appropriately chosen according to circumstances. Thus the frequency of repetition of the test pulses should be chosen according to the length of line to be tested and to the velocity of propagation in that line. If $f$ is the frequency of repetition, U the velocity and L the length of the line, then as a rough guide, $f$ may be chosen to be a little less than $U/2L$, so that the whole line length is covered in one sweep of the time base. When both ends of the line are accessible for test, double this frequency may be used and the two halves of the line may be tested from opposite ends. In the numerical example chosen for illustration, $f$ was 20 kilocycles per second and was chosen for a length of about 8 miles of coaxial cable accessible at both ends, in which the velocity of propagation was about $1.8 \times 10^5$ miles per second.

What is claimed is:

1. Apparatus for use with an electrical transmission line under test, for testing impedance irregularities therein, comprising a source of controlling frequency sine waves, means for generating pulses at a given rate and of a given form and duration energized from said source for application to said transmission line, said sine waves being synchronized with said pulses, a cathode ray oscilloscope having a control grid, horizontal and vertical deflection plates for visually indicating the results of the test, means connected between said source and said oscilloscope for providing a horizontal timing voltage for said oscilloscope controlled by said source, means connected through said transmission line between said source and said oscilloscope for providing a given vertical timing frequency for said oscilloscope derived from said source, circuit means connected through said transmission line between said source and said oscilloscope connecting the line and the vertical plates of said oscilloscope including a variable attenuator and an equalizing amplifier, said equalizing amplifier being connected between said attenuator and said oscilloscope, an impedance correcting network connected across the line and a control voltage generator connected between said source and said equalizing amplifier controlled from said source.

2. Apparatus according to claim 1, wherein said equalizing amplifier includes a forward amplifier and a negative feed-back path including an auxiliary amplifier the gain of which is controlled by said control voltage generator.

LESLIE ERNEST WEAVER.

REFERENCES CITED

The following references are of record in the file of this patent:

UNITED STATES PATENTS

| Number | Name | Date |
|---|---|---|
| 2,009,459 | Turner | July 10, 1935 |
| 2,121,359 | Luck et al. | June 21, 1938 |
| 2,167,492 | Sproule | July 25, 1939 |
| 2,300,999 | Williams | Nov. 3, 1942 |
| 2,324,816 | Born | July 20, 1943 |
| 2,345,932 | Gould | Apr. 4, 1944 |

FOREIGN PATENTS

| Number | Country | Date |
|---|---|---|
| 520,778 | Great Britain | May 3, 1940 |
| 545,778 | Great Britain | June 12, 1942 |